April 13, 1943. R. Y. BOVEE 2,316,394
EXPLOSIVE TYPE ENGINE
Filed Dec. 2, 1941  6 Sheets-Sheet 1
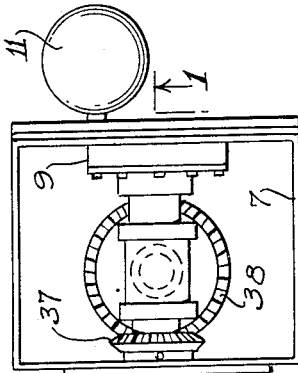
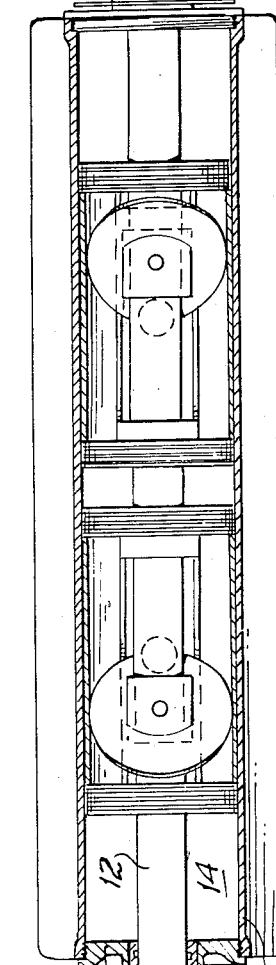
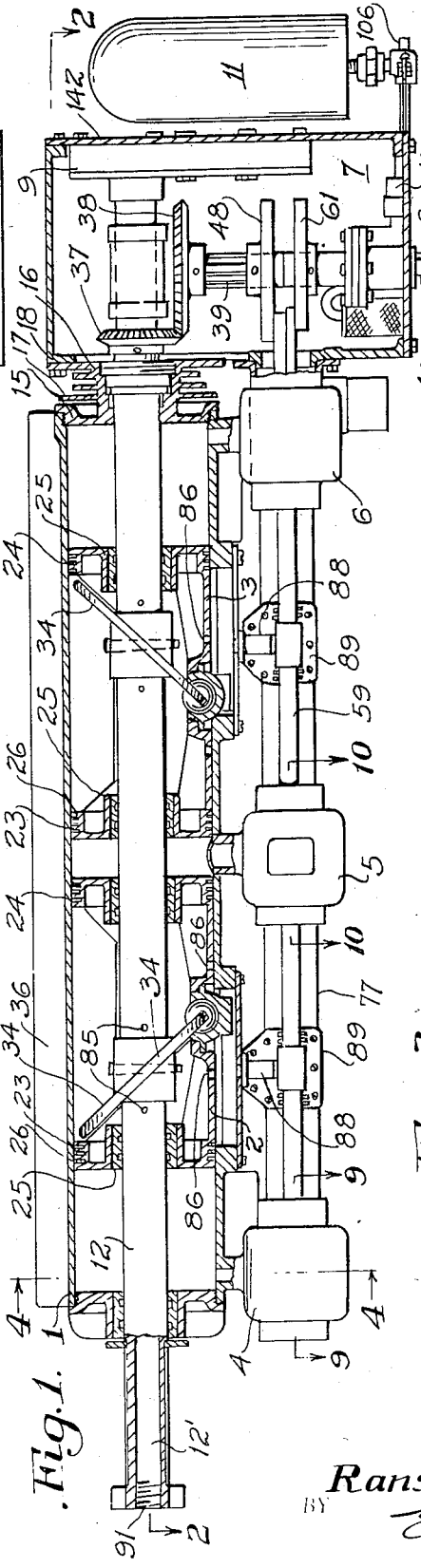
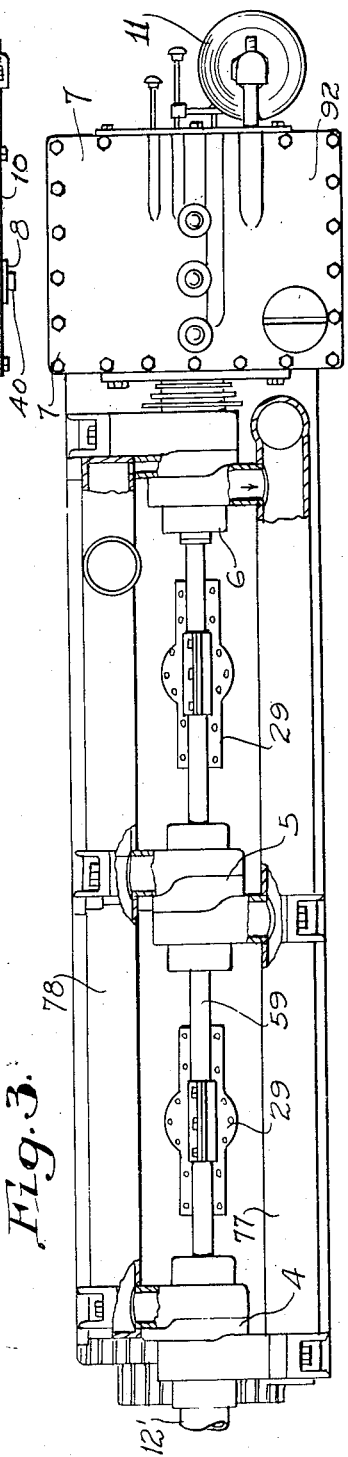
INVENTOR.
Ransom Y. Bovee
BY Earl E Moore
ATTORNEY.

April 13, 1943.    R. Y. BOVEE    2,316,394
EXPLOSIVE TYPE ENGINE
Filed Dec. 2, 1941    6 Sheets-Sheet 2
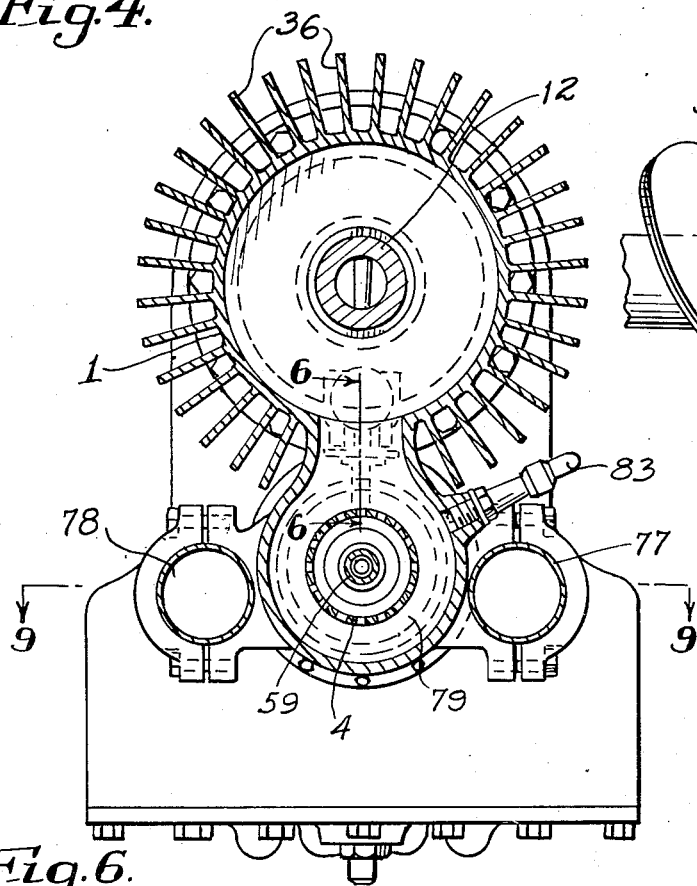
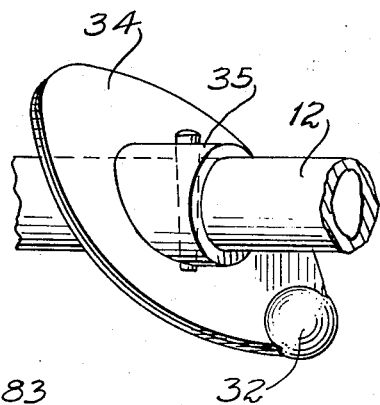
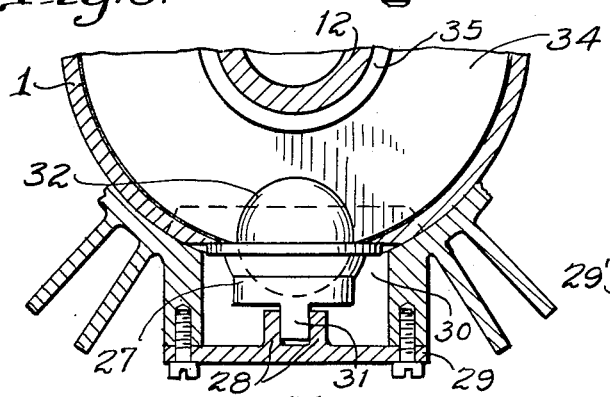
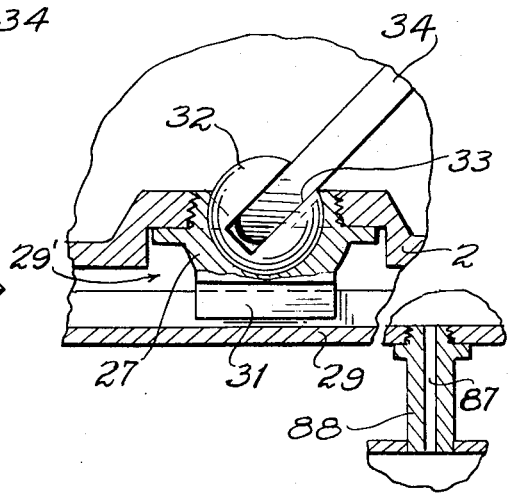
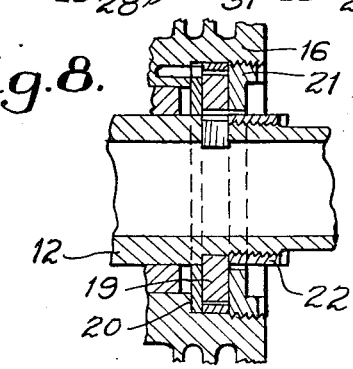
INVENTOR.
Ransom Y. Bovee
BY Earl E. Moore
ATTORNEY.

April 13, 1943.  R. Y. BOVEE  2,316,394
EXPLOSIVE TYPE ENGINE
Filed Dec. 2, 1941  6 Sheets-Sheet 3
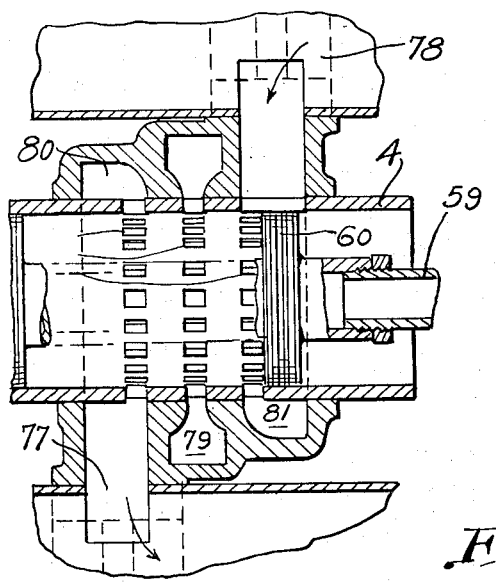
Fig.9.
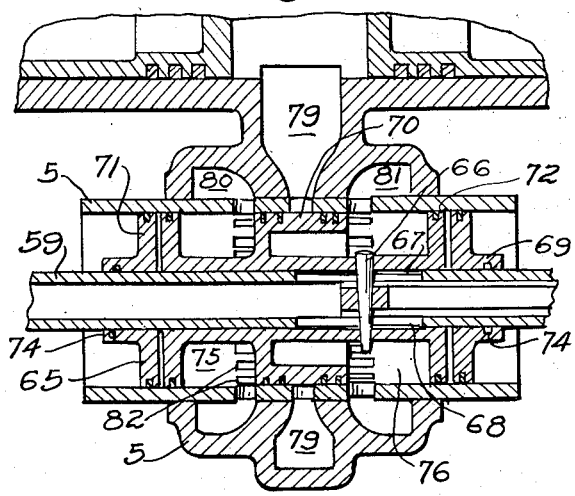
Fig.10.
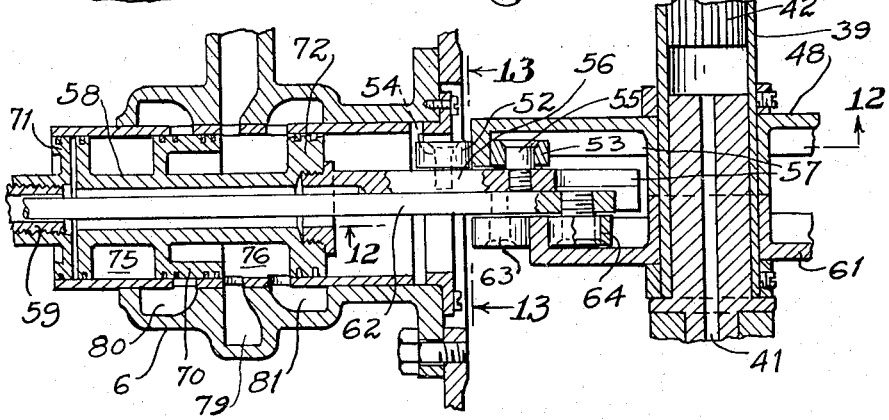
Fig.11.
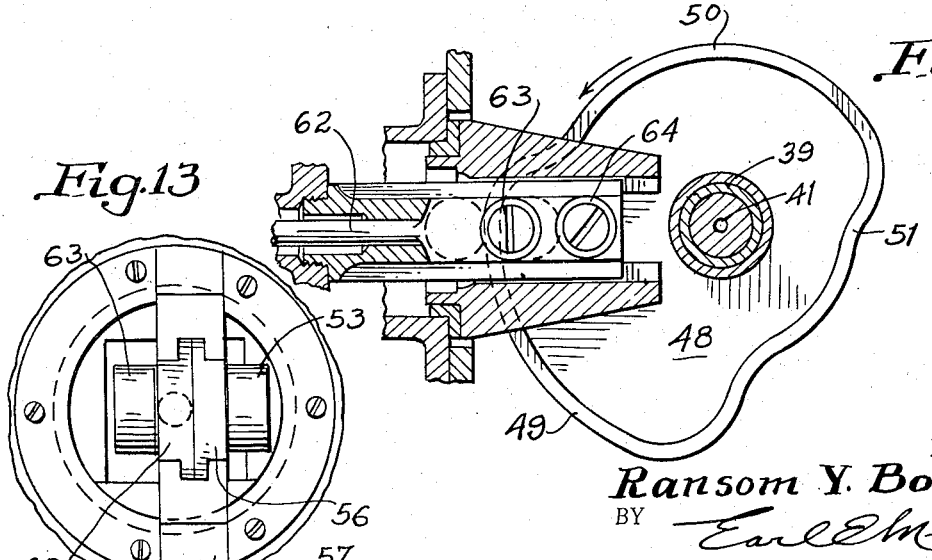
Fig.12.
Fig.13
INVENTOR.
Ransom Y. Bovee
BY Earl E. Moore
ATTORNEY.

April 13, 1943.   R. Y. BOVEE   2,316,394
EXPLOSIVE TYPE ENGINE
Filed Dec. 2, 1941   6 Sheets-Sheet 4
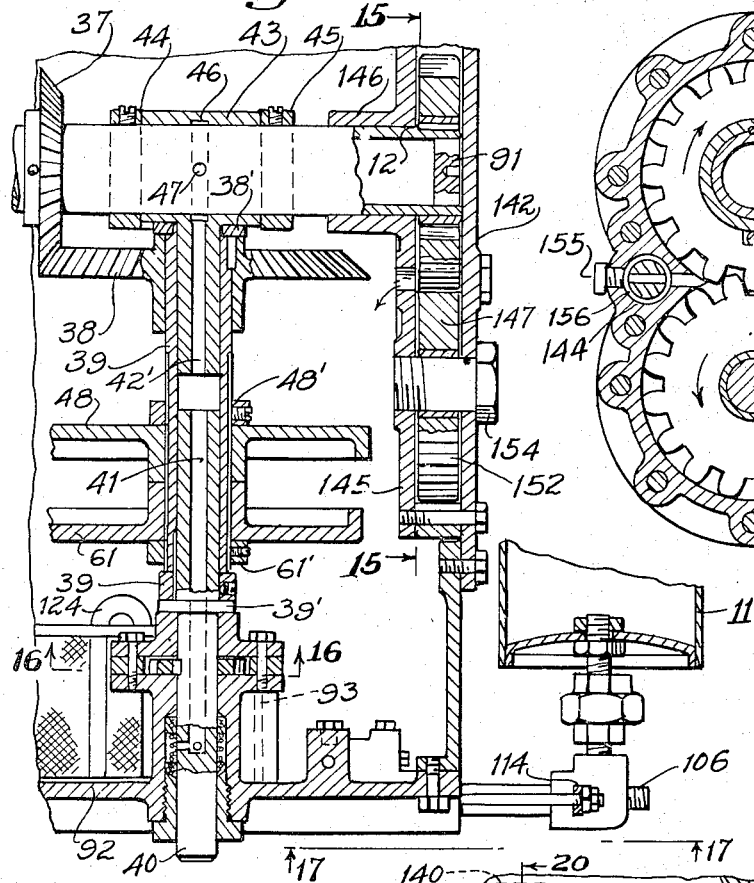
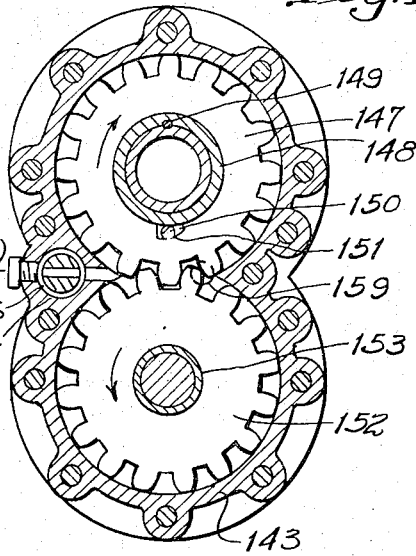
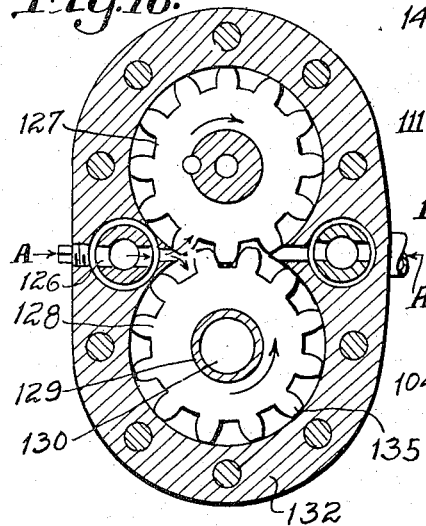
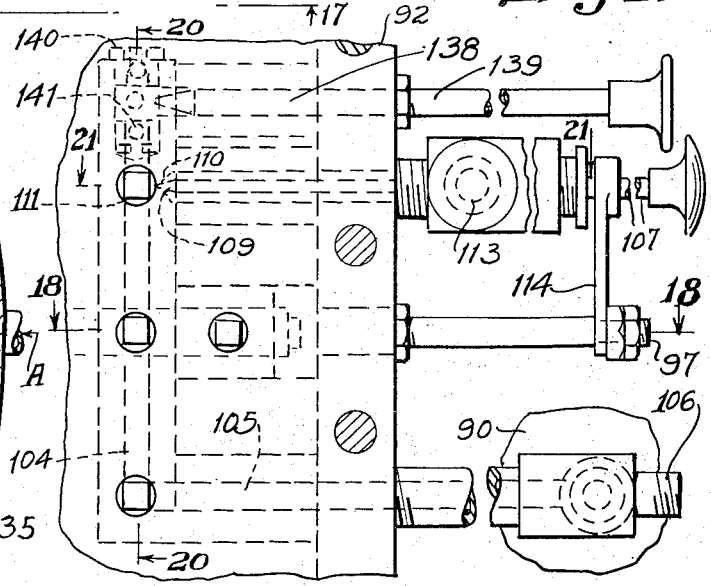
INVENTOR.
Ransom Y. Bovee
BY Earl E. Moore
ATTORNEY.

April 13, 1943. R. Y. BOVEE 2,316,394
EXPLOSIVE TYPE ENGINE
Filed Dec. 2, 1941 6 Sheets-Sheet 5
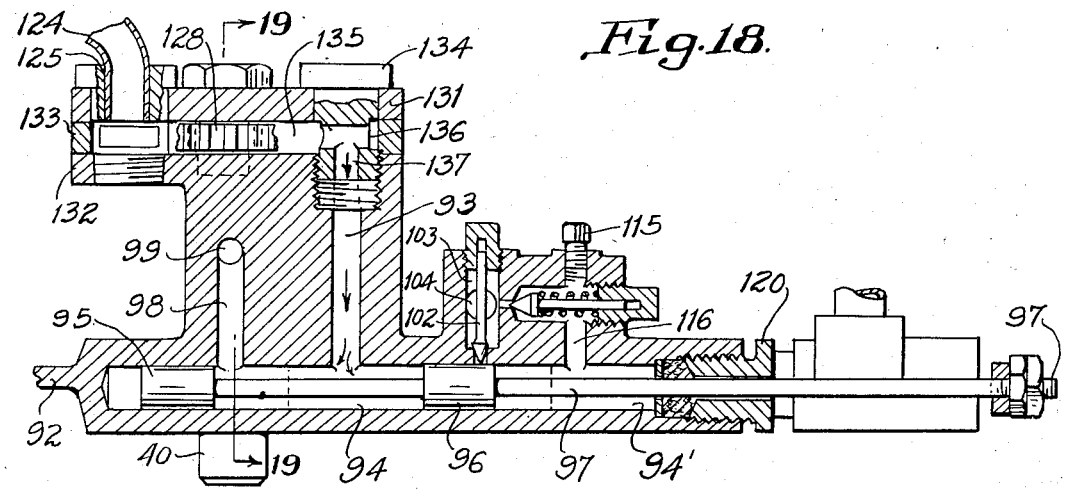
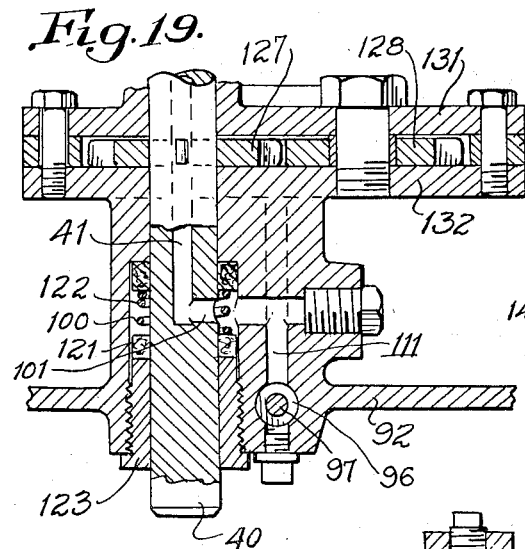
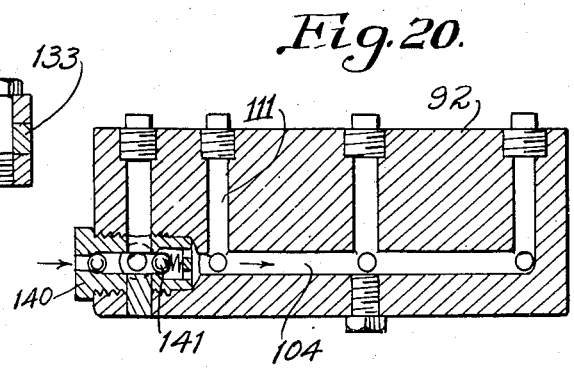
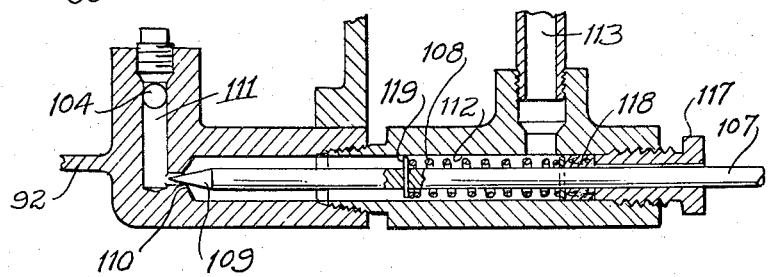
INVENTOR.
Ransom Y. Bovee
BY Earl Elmore
ATTORNEY.

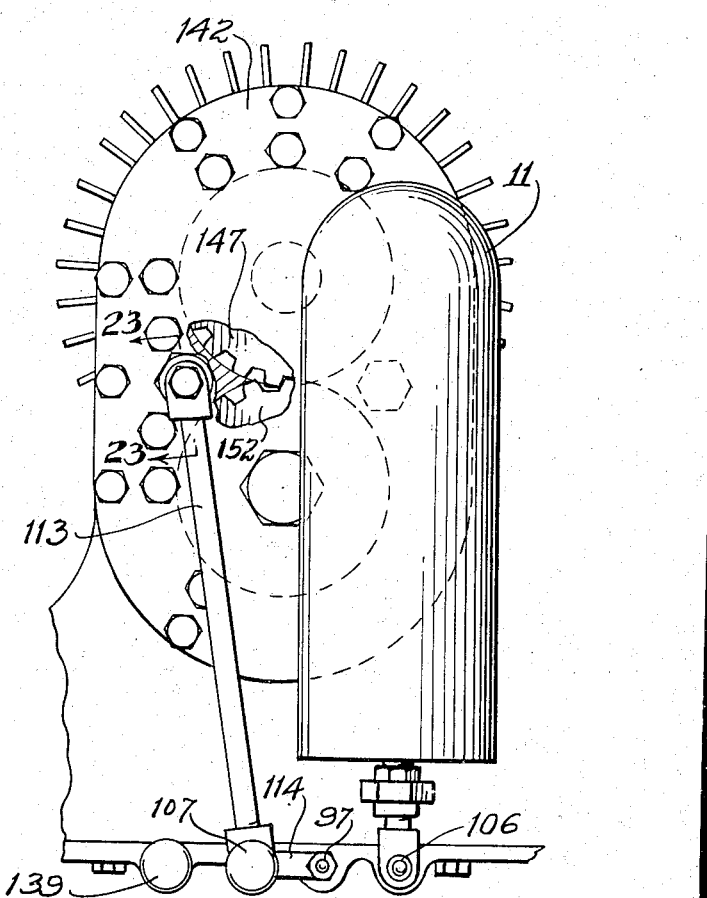
Fig. 22.
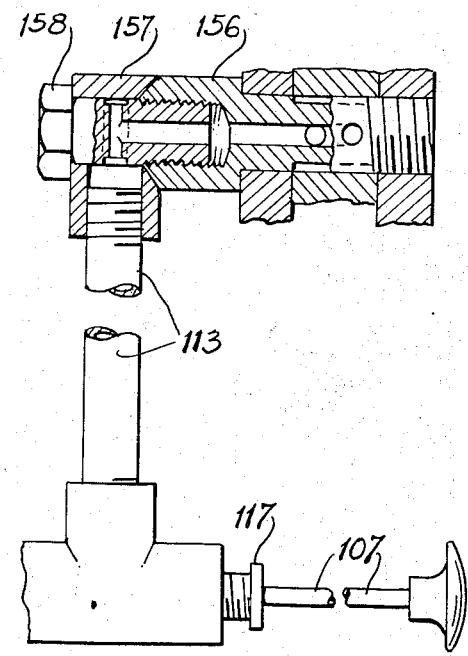
Fig. 23.
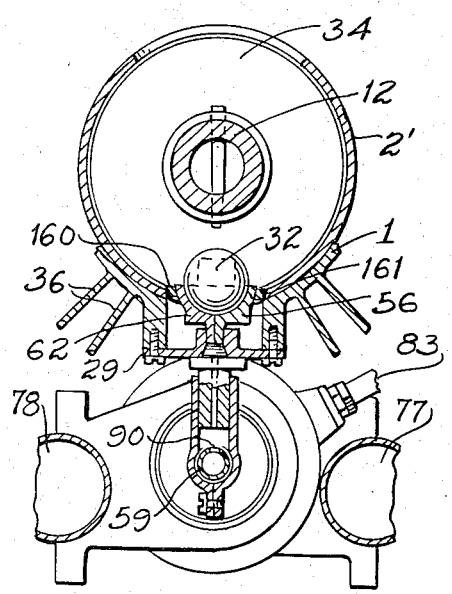
Fig. 24.
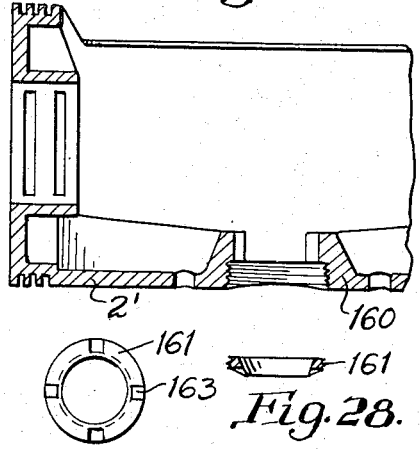
Fig. 25.
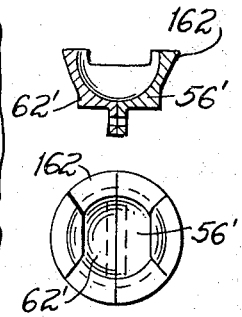
Fig. 26.
Fig. 27.
Fig. 28.
Fig. 29.
INVENTOR.
Ransom Y. Bovee
BY Earl E. Moore
ATTORNEY.

Patented Apr. 13, 1943

2,316,394

UNITED STATES PATENT OFFICE 2,316,394

EXPLOSIVE TYPE ENGINE

Ransom Y. Bovee, Venice, Calif.

Application December 2, 1941, Serial No. 421,376

16 Claims. (Cl. 123—51)

This invention relates to improvements in engines deriving their power from gas expansive energy in combination with reciprocating parts to produce rotation. The expansion of the fuel gas causes reciprocation of the pistons which transmit their power to a rotary shaft through the action of a rotary ovate plate which slides through a ball and socket joint. The socket is fixed to the piston and the ovate plate is fixed to the shaft, the plate slides through a slot in the ball and the ball rocks to and fro in its socket to permit the slot to follow the periphery of the plate and the piston to follow the reciprocation of the ball.

Means are provided in association with the pistons and their expansion chambers for admitting fuel gas and firing it as well as means for exhausting the burned gases. Also means are provided for thoroughly lubricating the moving parts of the engine and for starting the engine by fluid power.

A few of the principal objects of this invention is to provide a simplified means for converting gas expansion power into rotative motion in a new and novel manner.

Another object is to provide a more efficient and economical mechanical principle to generate power under light friction condition and thus conserve power losses attendant in the now more complicated design of engines; the high efficiency resulting by providing a simplified arrangement of all working parts to reduce frontal area, bulk, weight and cost of manufacture.

Another object is to provide an improved construction dispensing with expensive crank-shafts, cam-shafts, connecting rods, poppet valves, liquid cooling and a great multiplicity of cylinders, the power forces being equally balanced as well as the mechanical parts and their action so as to avoid vibration and the problems of counter-weighting to prevent destructive unbalanced forces.

A further object is to provide an improved mechanical means and method for reciprocating pistons so as to dispense with piston slap which destroys the compression seal of rings, pistons and cylinders.

Another further object is to provide an improved means of transmitting explosive and expansive power through reciprocating pistons to a power shaft without the application of transverse or longitudinal power thrust members acting upon the bearings thereof, to dispense with load friction and power loss by reason of a floating power shaft; to provide an improved valve construction and arrangement to control the action of the valve both ways without springs, to provide quicker opening and closing of the valves, to dispense with valve grinding but never the less providing valves with full lubrication.

And a still further object is to provide an improved design of an explosion engine with multiple explosion chambers in a single cylinder which may be stream-line air-swept in a longitudinal manner to admit of air cooling without blind spots, dead spots or hindering obstructions to prevent successful air cooling; and also to provide an improved self-contained system of self-starting or engine cranking, dispensing with the need of electric starting motors and storage batteries or auxiliary starting motors, or hand cranking, and to provide manual hand recharging of starting power in event of it being exhausted.

Other objects, advantages and features of my invention will appear from the accompanying drawings, the subjoined detailed description in the specification and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

In the drawings:

Fig. 1 is a vertical longitudinal section of one form of an engine constructed according to this invention, and shows the major elements upon which this invention is concerned, a few of the parts are shown in elevational view.

Fig. 2 is a horizontal longitudinal section of Fig. 1, and taken substantially along the line 2—2 thereof.

Fig. 3 is a bottom plan view of Fig. 1 showing the manner in which intake and exhaust gases are admitted to and from the valve control housings from the intake and exhaust manifolds.

Fig. 4 is an enlarged vertical section taken substantially along the line 4—4 of Fig. 1 disclosing the common inlet and outlet passage to one of the combustion chambers with the valve ports closed.

Fig. 5 is a perspective view of a crank-disc which is secured to the power shaft and takes the place of the well known crank.

Fig. 6 is a vertical cross section of a detailed part showing the piston thrust ball and its mounting on an enlarged scale.

Fig. 7 is a sectional part taken substantially at right angles to Fig. 6.

Fig. 8 is a cut-away section of the power shaft's longitudinal thrust bearing for taking the propeller thrust load in either direction as when used in an airplane.

Fig. 9 is a detailed sectional part of the invention taken substantially along the line 9—9 of Fig. 1, but with the valve heads or pistons removed.

Fig. 10 is a longitudinal section of the middle valve of Fig. 1 and taken substantially along the line 10—10 thereof.

Fig. 11 is a horizontal and longitudinal section of another valve assembly.

Fig. 12 is a sectional portion of Fig. 11 taken substantially along the line 12—12 thereof.

Fig. 13 is a section taken substantially along the line 13—13 of Fig. 11.

Fig. 14 is an enlarged vertical sectional view of the right end of Fig. 1, showing the end of the power-shaft, the gearing for driving the cams and oil pump shaft, the oil driven self-starting motor at the end of the power shaft, and a portion of the oil pressure storage self-starter tank.

Fig. 15 is a vertical cross sectional view taken substantially along the line 15—15 of Fig. 14, showing the oil pressure driven self-starting motor and the means by which the power-shaft is clutched when rotated thereby.

Fig. 16 is a cross-sectional view of the oil-pump taken substantially along the line 16—16 of Fig. 14. This view shows the intake and discharge of the oil-pump.

Fig. 17 is a bottom plan, substantially along the line 17—17 of Fig. 14 showing the oil sump bottom plate, oil pump base and oil control and distribution section thereof serving the self-starting functions and operations.

Fig. 18 is a longitudinal section of the control valve used in the invention, taken substantially along line 18—18 of Fig. 17.

Fig. 19 is a vertical cross section taken substantially along the line 19—19 of Fig. 18.

Fig. 20 is a detail part, shown in section and taken substantially along the line 20—20 of Fig. 17.

Fig. 21 is a section of a detailed part of the control valve taken substantially along the line 21—21 of Fig. 17.

Fig. 22 is an elevation of one end of the engine with a portion broken away to show the starter motor.

Fig. 23 is an elevation, partly in section, showing a detailed part of the control valve taken substantially along line 23—23 of Fig. 17.

Fig. 24 is a sectional elevation, similar to Fig. 4, showing a slight modification of the invention.

Fig. 25 shows in longitudinal section a part of the piston of Fig. 24.

Fig. 26 is a section of a detailed part of Fig. 24 and Fig. 27 a plan thereof.

Fig. 28 is a sectional view of a detailed part of Fig. 24, and Fig. 29 is a plan thereof.

This particular illustration of the invention comprises an elongated cylinder indicated by the reference character 1 having piston units 2 and 3 therein, intake and exhaust valve units 4, 5 and 6, an end housing 7 adjacent on end of the cylinder for holding oil, housing the gear and cam mechanisms, for housing an oil pump 8 and oil motor 9, a supporting control valve 10 and pressure tank 11, and a hollow tubular shaft 12 which passes through the cylinder 1, oil reservoir housing 7 and extends externally beyond one end of the cylinder as indicated at 12'.

Numeral 13 indicates the front cylinder head of a forward combustion chamber 14, threaded into or otherwise suitably secured to cylinder 1 and acting also as a sealing ring bearing support for the power take-off end of power shaft 12. This shaft extends concentrically through cylinder 1 and out of a rear cylinder-head 15, which incorporates the combination of a sealing-ring bearing and a double acting end-thrust bearing 16 having cooling fins 17. An engaging flange 18 secures the oil housing 7 thereto, the other side of the end head being threadedly engaged in one end of the cylinder as shown. The double acting power-shaft end thrust bearing 16 is more clearly shown in Fig. 8. The shaft 12 has a disc 19 fixed thereto which extends into a groove provided by a wall portion 20 of the end head and a removable flanged collar 21 which is threaded to the end head as shown. A sleeve 22 is threaded to a reduced portion of the shaft to seal same.

Hollow pistons 2 and 3 are mounted within the cylinder 1 and they surround the power-shaft and are reciprocable thereupon.

Each piston unit 2 and 3 consists of an open top cylinder or tube having end heads 23 and 24, each of which heads have a sleeve 25 with sealing rings for sliding along the shaft 12, as well as a peripheral flange 26 having sealing rings to engage the inner wall of the cylinder 1 in sliding contact. The piston units are held against rotation by a socket 27 which is suitably secured to a reenforced aperture in the bottom of the piston and a cross-head grooved member 28, see Fig. 6, which is mounted upon a cover plate 29. This plate covers and incloses the side apertures or slot 30 of the cylinder. The bottom of the socket has a lug 31 which engages the groove or track of the element 28 and slides therealong when the piston unit is reciprocated. A ball 32 is mounted in each socket or thrust-ball cage, the socket being preferably made in two halves and suitably secured together over the piston thrust-ball before it is screwed to the piston unit. The ball has a groove 33 to slidably engage the rim of a crank-disc or ovate plate 34 which rotates with and is suitably secured to the power-shaft 12 by an integral sleeve 35 which is keyed to the shaft. The crank-discs are preferably positioned at opposite inclinations and in pairs of opposite inclinations if more than one is used, such as in a two, four, six or eight piston motors. This balances the reciprocating inertia forces of both the pistons and the explosions thereagainst. To remove the heat of combustion, the cylinder is provided with a plurality of fins 36 which readily radiate and conduct the heat to the atmosphere.

Pinion gear 37, Figures 1, 2 and 14, is suitably secured to power-shaft 12 and drives a mating gear 38, which operates the combined pump and cam drive-shaft 39, and the timing or magneto shaft 40; which shafts have a small bore 41 employed as a means of communicating oil from the pump into the power-shaft 12. The bevel gears 37 and 38 are suitably keyed to their respective tubular bearing drive-shafts. The shaft 39 has its bearing upon a hollow spindle projection 42 from a floating sleeve bearing 43 which is mounted upon the power-shaft 12, as shown, between spacing collars 44 and 45. The projection 42 has a bore 42' for the passage of lubricant. The floating bearing is drilled through its projecting spindle into a center ring groove 46 formed within the power-shaft bearing, and which communicates with oil holes 47 entering the interior of the power-shaft 12. This is the means of conducting lubrication oil from the bore 41 into the rotating power-shaft 12.

A valve actuating cam 48 is provided with three principal stages or varied surfaces 49, 50 and 51, see Fig. 12, the cam plate being keyed or splined to tubular shaft 39. The side projecting flange of the cam is formed to engagingly ride between two rollers 52 and 53, see Fig. 11, which rollers are mounted upon suitable bearings 54 and 55 respectively. The bearings are suitably secured to a valve thrust element 56 which reciprocates in the groove of a guide bracket or track 57, see Fig. 13, secured to the valve-housing 6. This valve thrust element 56 is screwed into or otherwise suitably secured to a hollow piston-valve 58, which in turn engages an oil returning valve thrust-tube 59. This thrust-tube slidably passes through the center valve 5 and engages the center oil communicating bore of a piston-valve 60. This oil tube 59 provides a means of actuating valve 60 in unison with valve 58 so as to synchronize the out-end explosions and other functions of the two opposed pistons 2 and 3, and to further provide return of oil therethrough, and other purposes to be explained.

A valve actuating cam 61, the same construction as cam 48 excepting that its valve positioning stages are in opposition thereto, actuates a valve thrust element 62 through rollers 63 and 64, mounted upon suitable stud bearings. This element 62 is an elongated rod having its cam end configurated to slide in the groove or track 57 along with 56. The extended rod end element 62 passes through the center oil return passage of valve 58 and through a portion of valve thrust-tube 59, and terminates within piston-valve 65, see Fig. 10, where through a suitably formed end it engages a taper pin 66 which passes through suitable slots 67 and 68 in the tube 59. The pin 66 engages a surrounding portion 62 or sleeve 69 of valve 65, thus securing the movement of said valve to the rod 62, so that the movement of this valve is independent of the tube 59. All the valve units have a central cup-like sliding head 70 and end disc-like heads 71 and 72 spaced from both sides of the central head. Each head has the usual piston-like sealing rings which snugly engage the inner cylindrical walls of the valve housings 4, 5 and 6. These central and end heads divided their respective valve housings into two isolated chambers 75 and 76, the chamber 75 providing a passage between the combustion chamber and an exhaust manifold 77 and the chamber 76 a passage between the fuel intake manifold 78 and the combustion when the chambers are in registration with the combustion chamber. Surrounding each valve housing there is a circular combustion chamber extension or firing chamber 79, on one side thereof, there is an annular exhaust chamber 80 and on the other side an annular fuel intake chamber 81. A plurality of ports 82 are provided in the walls of the valve housings for connecting their respective annular intake, exhaust and firing chambers with the valve chambers 75 or 76 in a manner which should now be obvious to one skilled in the art.

The slots 67 and 68 in valve thrust-tube 59 admit lubrication to the sliding areas of the valve and to the various oil holes between the ringed grooves at the piston extremities. Oil leakage around the tube and the encompassing valve 65 is prevented through suitable oil wiping rings 74 provided in the hub of both end extremities of the valve. Similar oil passages are provided in valves 4 and 6 so that these are thoroughly lubricated and provide a good path for the passage of oil therethrough.

To more clearly understand the central passageway in each valve housing surrounding ports 82, indicated by the numeral 79, reference is made to Fig. 4, showing the firing chamber 79 and combustion chamber, the firing chamber extending around the central portion of the valve and having a spark-plug 83 located therein. The firing of the explosive mixture around the valve, causes the expanding gases to meet at the combustion chamber port to set up gas turbulence thus slowing down the burning of the gases and thereby preventing detonation and resultant loss of power therefrom.

To more fully understand the operation and timing of the valves 4, 5 and 6, reference is made to Figs. 9, 10 and 11, the latter showing the valve standing in the intake position as the ports 82 of the intake and firing chambers have been brought into communication with each other by reason of the surface 49 on cam 48, note Fig. 12, this cam surface having thrust valves 4 and 6 to their intake positions for admitting inflow of gas from manifold 78, into passage 81, through ports 82, into valve chamber 76 and then through ports 82 thereof into the combustion chamber via firing chamber 79. Upon completion of intake, the cam 48 draws the valve to the middle surface 50, thus positioning these end valves centrally, as in Fig. 10, for instance, sealing the combustion chamber during compression and firing. Thereafter, the cam arrives at the low land or surface 51 and thrusts the valve to the extreme right position covering the intake ports and bringing into communication the ports of the firing chamber and the exhaust chamber having connection with the manifold 77. Upon completion of the exhaust cycle, the cam 48 thrusts the valves back to the high land or surface 49 or intake position and thus completing the four stroke cycle of the piston. The recessed or cup shaped configuration of the center piston head of each valve is provided for additional cooling surface of the intake gases and to additionally cause gas drying turbulence which adds to the thoroughness of combustion and high efficiency.

To establish an outlet for lubricating oil from the interior of the pistons 2 and 3 which are supplied from the hollow power shaft via of holes 85, the bottoms of the pistons have discharge ports 86 which communicate with the chambers 30. From this chamber, the oil passes to the tube 59 via the bore 87 in the studded anchor tube 88 removably secured to the plate 29 and to the tube 59. A yoke 89 is made in complementary halves so that it may be made to securely anchor upon the stud-tube 88 for vertical adjustment and also slidably surround and engage valve thrust-tube 59 so as to establish sealed oil communication through the tube 88 and oil communicator 89 and around valve thrust-tube 59 and through openings 90 therein, see Fig. 24. This lubricates the valves and returns the oil into the bottom of oil-sump 7. The oil communicator 89 is suitably provided with oil sealing or packing rings surrounding thrust tube 59, which may be ring grooved thereupon. The said rings are spaced apart to admit of reciprocation of the thrust tube 59 with its oil inlet 90 to remain within the spaced sealing extremities of the rings.

Spark plugs 83 are provided in the firing passages 79 of all valves, the arrangement thereof aids in producing combustion turbulence or currents which tend to prevent detonation by lengthening the period of flame duration.

It will be readily seen that the mounting of the pistons upon the guiding central power-shaft 12 and within the cylinder bore, that the action of the pistons with respect to the power-shafts transverse load-bearing support, is floating, and that the entire thrust of the pistons is delivered upon the oppositely arranged crank-discs 34 in counterbalanced, counter-opposed concurrence; there is likewise, no end bearing thrust upon the power-shaft thus accomplishing a floating action thereof.

It will further be seen that this construction provides reciprocating pistons without connecting rods. The usual crank swing of the connecting rod in present construction has inertia forces which cause piston slap and side wear upon the compression rings and hence egg shape wear upon pistons and cylinders. These faults are entirely absent in my construction as well as the uncompensated vibration losses in power caused by side whip in the piston end of connecting rod motion. Thus an advantage is claimed in the present invention in the provision of a construction which provides a floating power-shaft and floating pistons having inherent balance in respect to motion and equal opposition, which it is obvious will conserve power, save friction, and prolong the life and efficiency of its working parts.

The hollow tubular center of power shaft 12, Figs. 1 and 14, is provided with plugs 91 at or adjacent its end extremities. These plugs are provided to confine lubrication, passed therethrough, within the extent of the bearings and parts requiring lubrication. However, when it is desired to maintain a hollow passage-way throughout the entire length of the shaft to operate variable pitch air propellers and the like or other devices, then a slightly smaller tube of less diameter may be inserted with its ends enlarged to fit and seal the space between the smaller tube and the shaft so as to inclose thereby the lubrication passage of the shaft and thus leave a central opening through the power-shaft with its rear end extremity adapted to be projected through the oil-sump. Should this central shaft opening be employed for an aircraft engine, the opening could be the bore of a gun.

The oil sump bottom plate 92 includes the lower pump shaft bearing, the oil pump base, the magneto or timer mounting base, the lubrication passage and outlet into the pump drive-shaft, and incorporates the self-starter starting valve, the self-starter pressure tank charging valve, a cutout valve, a hand charging pump and other oil passages incidental thereto shown principally in Figs. 1 and 14. The oil pump outlet passage 93, see Figs. 14 and 18, delivers its oil into oil control passage 94, between two spaced apart and connected pistons 95 and 96 mounted upon the common rod 97, which normally functions in the position shown. This position conducts the pressure oil through the oil passage 98, and through passage 99, into a sealed communication chamber 100, which surrounds pump-shaft 40. From the oil communication passages 101, there is a drilled opening into the hollow delivery passage 41 extending through shaft 40, from which the oil passes into the power-shaft 12 via of opening 47.

When the piston valve 95 is manually moved outward which occurs when the starting valve is opened, the pistons 95 and 96 move to the positions of the dotted lines as shown in Fig. 18, diverting the oil flow from the pump, by the way of a check valve 102, into a passage 103, which communicates with the cross-drilled oil passage 104, also shown in dotted lines in Fig. 17, through which the oil passes into passage 105. From this passage, the oil passes to the oil-pressure self-starter tank 11, Fig. 14, and there retained by reason of check-valve 102. Here, in tank 11, oil under high pressure is stored for starting the engine.

In order to supply a compressed gas or an expansive pressure gas to cushion against the oil driven into the starting tank 11, in sufficient quantity to completely empty the tank 11 of its stored oil, an initial charge of compressed air of sufficient pressure is supplied to the starter tank through air-valve 106, see Figs. 1 and 14. The starting oil is stored under sufficient pressure for starting the oil motor which cranks the engine.

It is further anticipated, should the need arise, that a closing valve may be provided in the outlet of the pressure starter tank, to close at a predetermined pressure to retain the initial air charge to be placed in the tank 11, the closing valve will be forced open by the pressure of the oil at all pressures above that at which the air-retaining closing valve is set.

The starting valve rod 107 when manually operated is pulled outward against the pressure of the spring 108 which spring is normally sufficient to keep the valve 109 closed at its seat 110. Upon opening this valve, oil from the passage 104 flows into passage 111 through valve seat 110 and then through passage 112, Fig. 21, through tube 113 into the starting motor. The starting oil is cut off when the valve rod 107 is released and its valve forced upon its seat against the starting pressure by the spring 108.

To position the piston-valves 95 and 96 for recharging the starter tank 11 when the engine is started, a suitable arm 114, Fig. 17, suitably secured to the starting valve rod 107, and freely engaging a headed portion of the projecting stem or rod 97 is provided to pull the piston valves 95 and 96 into re-charging position.

Upon the starting of the engine, the oil pump, in a few seconds, recharges the displaced oil from the starter tank up to a pressure predetermined by the pressure release valve 115, Fig. 18. The oil admitted through valve 115 passes into communicating oil passage 116 which discharges the pumped oil pressure into the passageway 94'; this thrusts the piston valves 95 and 96 back into its engine lubrication delivery position as shown in Fig. 18.

To prevent pressure leakage around the stem or rod 107 of the starter valve, an adjustable packing gland is provided at 117, whose inner end is abutted by packing 118 surrounding the valve stem, and which is inclosed by a sliding washer against which bears the pressure resisting spring 108. The other end of the spring engages a thrust ring 119 suitably secured to the stem. The spring holds the valve head against its seat 110, and also acts to keep packing 118 tight around the valve stem.

To secure the piston valve rod 97 against leakage there-around, a customary packing gland 120 is provided. An improved packing gland for the pump drive shaft 40 is shown at 121, Fig. 19, in in which two opposed packing glands sealed by washers astride the port 101 and surrounds the shaft 40. These washers are held outwardly with respect to each other by a compensating compression spring 122 to take up wear upon the packing and maintain a tight oil admission chamber around the revolving pump shaft. A bearing sleeve or gland 123 is provided to aid in the support of the lower coupling end of shaft 40 which also acts, at its upper extremity, as a thrust retaining shoulder for the packing gland 121.

The improved oil-pump, Figs. 14, 16, 18 and 19, intakes through a tapered tube fitting 124 via of the head of bolt 125 which in turn communicates with a cross drilled bore 126 into a relief passage turned there-around at the point of intake into pump gears 127 and 128, the said intake bolt providing a sturdy means that will not bulge, distort, wear or leak which is common to this type of pump. The driven gear 128 rotates upon a spacing sleeve axis 129 to admit restrained pressure from hub-bolt 130 against the plates 92 and 131 to securely hold the said plates against pressure distortion or binding the gear.

The pump gears are slightly recessed into a housing 132 and have spacer plate 133 to prevent binding of the gears 127 and 128 when the tie bolts secure plates 131 and 132 together to thereby provide a complete housing for the said gears in a close fitting race. I employ tie-bolts 125 and 134 for my pump which are suitably adapted for oil circulation therethrough to thereby reduce exposed high-pressure areas to prevent bulge and distortion and hold the structure securely together across the center line A—A, Fig. 16, the center of high pressure.

Following the direction of the arrows on pump gears 127 and 128, Figs. 16 and 18, the oil carried there-around is discharged through outlet port 135, via an under-slot cut through a portion of the bridge between the gear race and the tie bolt 134 to reduce high-pressure distortion. Outlet tie-bolt 134 has a reduced section of its diameter communicating with outlet port 135 at 136, providing an oil passage therearound and which connects into cross and center drilled passage 137 and thus into the delivery passage 93. Thus I have described an improved oil pump that is adaptable to the delivery of high oil pressures for self-starting as well as for the usual circulation of oil in the moving parts of the engine for lubrication.

It is obvious that in the foregoing method of self-starting through a storage pressure tank charged by the lubricating oil-pump, that the pressure tank may become exhausted, and not have a starting pressure. Therefore, provision is made to manually restore starting pressure when any need for it arises. This is accomplished, preferably, in the manner shown in Fig. 17, in which 138 is a hand pump having a plunger rod 139 suitably adapted to fit the cylinder of the pump, the pump being in the base plate 92. The pump draws sump-oil through ball-check-valve 140, and discharges it through ball-check-valve 141 (see Fig. 17) into the pressure passage 104 and from there into the pressure starting tank 11. This provides an emergency means for manually starting the engine.

The engine starting motor using oil pressure is shown in Figs. 1, 2, 14 and 15. The motor is mounted within the oil sump 7 and engages the power-shaft 12 at its extreme end, and where the motor is mounted upon the sump back-end plate 142 which also comprises the outer side housing of the starting motor. The motor gear-race housing is indicated by numeral 143 incorporating also the drilled inlet passage 144 which is so provided as to reduce pressure area upon the side plates beyond that necessary for satisfactory operation. 145 is the inner side housing plate with a projecting bearing hub 146 which is adapted to support and center the power-shaft 12 therein, and also provide mounting for the motor clutch gear 147. This gear freely rides upon a hardened bushing bearing 148 keyed at 149 to the power-shaft 12. A roller slot 150 is cut lengthwise of the bearing hole in gear 147, tapering backward from the direction of rotation, when propelled by oil pressure as indicated by the arrows. A roller 151 traverses the length of the slot and engages the power-shaft bushing 148 when gear 147 is driven in the direction of the arrows. The roller 151 rolls into the small end of the slot and becomes wedged between gear 147 and the shaft bushing thus clutching the two together to turn over the engine. Upon starting of the engine, the roller 151 rolls back into the front or large part of the tapered slot and the gear is freed from its clutching engagement with the power-shaft.

The companion oil motor gear 152 is mounted upon a bearing sleeve 153 which spaces the side plates 142 and 145. The hub-bolt 154 is provided to support the sleeve and its gear and prevent bulging of the side plates. The drilled inlet port 144 is suitably plugged at 155 to prevent leakage. The oil pressure inlet union 156, in addition to securing the side housing plates together to prevent bulging from pressure at the inlet, serves also as an oil inlet passageway into the port 144 is suitably plugged at 155 to prevent leak-member 157 thereto. The member 157 (see Fig. 23) is secured to the union 156 by the cross drilled connecting semi-hollow bolt 158 having a communicating clearance passage there-around admitting oil from pressure tank 11 there-through via of duct 113. The numeral 159, Figs. 14 and 15, indicates the oil outlet into the sump 7 from the starting motor gears. Additional pressure relief holes may also be provided around the passage of the gear teeth to release compression as soon as practical beyond the inlet point so that the starting pressure will not be wasted.

The pump drive shaft assembly is shown in a form of construction that is best adapted for easy assembly. It enables the pump shaft 40 and the entire pump unit to be withdrawn from engagement with the splined tube shaft 39 when plate 92 is removed, and also permit removal of the cams and the withdrawal of the assembled valve. The cams are preferably splined to tube-shaft 39 which, at its upper extremity, is secured to the large bevel gear 38, and which engages a thrust washer 38' to take up thrust of the pump-shaft assembly. The cams are longitudinally spaced with respect to their axis by spacing collars 48' and 61' which have set screws to lock them to tube 39. The pump shaft is splined on an enlarged diameter which extends sufficiently above its down thrust shoulder 39' to engage splines in the inside lower end of tube 39 to provide driving connection between them. The collar 39'' is locked to the shaft by a set screw and is adapted to hold up the shaft in proper spaced relationship and also keep the cams in their proper working position.

Figs. 24-29 show a slight modification of the invention. The socket and ball mounting is the difference from the preferred form of the invention, therefore, all the parts in the modification having the same design as in the preferred form have the same reference characters. In this modified form, the piston unit has been designated 2' and the threaded embossed opening thereof 160. Intermediate the periphery of the opening and the socket elements 56' and 62', there is a spacer ring 161 which is threaded to the periphery of the opening. This ring provides a snug seat for the bevelled portion 162 of the socket elements. The ring 161 is provided with grooves 163 so that it can be tightened by any suitable tool in a manner obvious to those skilled in the art.

The parts and their functions on this improved motor having thus been explained, its operation will now be described.

*Operation*

The position of the pistons in Fig. 1 shows them at their nearest meeting point at the center of the cylinder 1 and in the firing position. The valve 5 is in its closed position sealing the inlet and outlet passages to the combustion space between the opposing faces of the pistons. This places the pistons at dead center with the firing change ignited and the gas beginning to expand. The end pistons have reached the end of their intake strokes and their respective valves are shown open. At this moment, the cam 48 begins its half thrust to centrally position valves 4 and 6 and seal their intake charges for the compression stroke of their respective cylinders. As the power-shaft 12 turns past dead center, the increasingly receding angularity of crank-discs 34, followed by the thrust of both pistons in oppositely outward strokes, imparts a rotating thrust upon the outer rim of each crank-disc from the slotted swivel balls 32, against which the explosion driven pistons exert their thrust. The rims of the crank-discs slide through the slotted balls driven against them by their respective pistons to carrying them to the end of their opposite angularity so that the piston units and compress the combustion charge in the outer combustion chambers, whereupon the charges are fired and the crank-discs pass their dead center and reverse their angularity. These crank-discs are driven in the same direction of rotation inward as on the outward thrust.

At the end of the outward stroke of the pistons, the center valve 5, serving the middle combustion chamber, then opens by being thrust rightward by the cam 61 so that the common communication ports 82 are uncovered Fig. 10, the burned gases entering the valve chamber 75 and pass out through exhaust ports 82 into the exhaust passage 80 and into the exhaust pipe 77.

The firing of the combustion charges in the outer combustion chambers drive the pistons toward each other, expels the burner gases in the middle combustion chamber at the point of their closest approach the valve 5. The valve 5 is thrust to the extreme leftward position of intake by the cam 6', as, for example, in Fig. 11, establishing intake communication through the common ports 82 into the valve chambers 76, admitting gas mixture through ports 82 thereof and intake 81 which communicates with the intake pipe 78. The rotation of the shaft 12 is caused through the crank-discs 34 which are driven by the pistons to intake a fuel charge in the middle combustion chamber while expelling the burned gases from the outer combustion chambers. The valves 4 and 6 have been thrust to the extreme right establishing exhaust communication therethrough as described for the center valve 5. When the pistons have reached the outer end of their thrust, center valve 5 is carried rightward to its center compression sealing position with its center piston section astride the ports 82 and with compression rings on both sides thereof, whereupon the inwardly driven pistons compress the fuel charge therebetween and the igniting thereof again drive them outward, thus completing the working cycles of their propulsive arrangement.

The pinion gear 37, Figs. 1 and 14, propel bevel gear 38, the cam-shaft tube 39 and the pump-shaft 40, which at its lower extremity projects through sump base plate 92, and provides a driving shaft for a magneto or spark timer, not shown, which supplies ignition to the spark plugs. The spark plugs are fired simultaneously when the fuel of their cylinders is compressed and spark plugs are fired at the end of the compression stroke of their respective piston. It will be observed that the spark plugs instead of firing directly into their respective combustion chambers, they fire into the circular passage around their respective valves, see Fig. 4. This manner of firing results into two currents of flame into the combustion chamber, thus causing gas turbulence to avoid too rapid detonation and hence undesirable knocks.

Lubrication is supplied through pump intake tube 124, Figs. 14 and 21, around the pump gears 127 and 128, Fig. 16, through passage 93, Fig. 18, into passage 94, out through passage 98 into passage 99 and to the communication chamber 100 surrounding the pump shaft 40, Fig. 19. The oil then passes through port 101 into the hollow center passage 42' of the pump shaft and from whence it passes up through the hollow stem of the saddle bearing 43 into passage 46 surrounding power shaft 12, Fig. 14, then through ports 47 into the interior of power-shaft 12. The hollow shaft communicates with all power-shaft bearings and the oil outlet through ports 85 and then discharges into the hollow interior of the pistons and lubricates the end bearing thereof and the power shaft, the crank discs 34 sliding in the swivel balls 32. From inside the pistons, the oil is forced through ports 86 in the bottom of each piston and then discharges through the slotted cross-head chamber 29', down through anchor tube 88 into the oil communicator member 89 at each piston. From member 89, the lubricating oil is outletted into the hollow passageway through valve tube 59 and after lubricating the valves communicating therewith, the oil passes through the rear valve and enters the oil sump. The cams 48 and 61 and the rollers engaging them and the valve thrust slides are all thoroughly lubricated.

The self-starting system is an integral unit with the oil pump and the lubricating system and the oil sump, and it is dependent thereon in its operation in the manner shown. It may, however, be independently operated with an independent pump and an automatic cut-in and cut-out valve for pressure tank charging. The present illustrated mechanism was designed to reduce parts, weight and cost. Beginning with the oil supply from the pump passage 93, note Fig. 18, the oil enters 94, is diverted by manual movement of the starting rod 97 which shifts valve 95 to cut off engine lubrication port 98 and opens passage 103 via check valve 102 from which the oil is pumped into passageway 104 and delivered into passage 105, see Fig. 17, and therethrough into the air pressure storage tank 11.

The starting of the engine is accomplished by pulling outwardly valve stem 107, Figs. 3, 17 and 22, which through arm 114 pulls recharging valve 97 into position for recharging when motor is started. Valve 109 admits oil under air pressure from the tank 11 communicating therewith into the tube 113, through the inlet bolt 156 and hence to the starting gears 147 and 152. The oil gear 147 forces the roller 151 backward into the narrow end of its tapered slot to thereby cause the gripping of the power shaft and imparting starting torque thereto. Upon starting and the sudden forward rotation of the power shaft, the roller 151 releases and falls into free position and thereby releases the gear 147 which may idly rest upon the rotating power shaft.

Upon starting of the engine, the starter valve is released which cuts off the pressure supply of oil from tank 11 and the double piston valve 95 and 96 directs pressure oil into the tank 11. When the tank pressure reaches a predetermined pressure, the cut-out valve 115, Fig. 18, opens against the resisting spring and by-passes the overflow through into passage 116 into 94' where the piston valves 95 and 96 are thrusted back into position for delivering lubrication to the motor.

To provide additional means for charging pressure into the starting tank when low or exhausted, hand pump 138 is used. Manual operation of the rod 139 recharges the tank 11 to obviate the danger of hand cranking and otherwise starting failures which may be due to lack of oil pressure. Although this engine was designed for supplying power to an airplane propeller to be fixed to the shaft extension 12', it is obvious that this engine may be used for any general power purposes, and in which event, a fly wheel would be substituted for the propeller on shaft extension 12'.

It will further be seen that in the operation of the present invention the number of pistons are not limited to those shown and the valve system may be increased in units according to the number of pairs of pistons. The crank discs 34, in order to balance the reciprocating inertia forces of the pistons, must be of diametrically opposite lean or angularity so as to balance the secondary inertia forces of the explosions and thus overcome the destructive effect of vibrations.

It is further intended in this design of the invention that where more than one pair of pistons are used, a partition may be provided in the cylinder 1 to separate each piston unit and its mechanical movement on the power-shaft 12 so that, if desired, its explosion order may be in opposite time to increase the explosion impulse frequency, and, it is further anticipated in the present application that the mechanical movement herein shown and described, shall be applicable to steam engines, air compressors, etc.

Having thus described my invention, what is claimed as new and desired to be secured by Letters Patent is:

1. An engine comprising a cylinder with a plurality of pistons reciprocable therein, a power shaft extending concentrically through each piston, cylinder heads having shaft bearings inclosing the cylinder and supporting the power shaft therethrough, inclined crank-discs fixed to the power shaft within each piston, each piston having a slotted ball mounted within a bearing cage thereof, the slot through the ball engaging the outer rim of the crank-disc to follow movement thereof and impart reciprocatory piston thrust to the sliding rim of the crank-disc and cause rotation of the shaft.

2. The engine recited in claim 1 wherein a combustion chamber is formed between the pistons and between the pistons and the cylinder heads, intake and exhaust and exhaust ports communicating with the combustion chambers, and valve means to admit fuel to the chambers, said means operating to charge fuel into the end chambers simultaneously and the chamber between the pistons subsequently.

3. An engine embodying a cylinder having intake and exhaust ports at each end thereof, intake and exhaust ports at the middle thereof, dual opposed piston units within the cylinder spaced to form a center combustion chamber and a combustion chamber at opposite ends of the cylinder, valve means to open and close the ports, said combustion chambers operating to simultaneously drive the dual piston units away from each other and toward each other in sequence, track means to slidably secure the pistons against rotation within the cylinder, cylinder heads with power shaft bearings at the ends of the cylinder, a power shaft extending through the cylinder head bearings and through the pistons, crank-element means upon the shaft coupled with the pistons to reciprocate them and also cause the pistons to rotate the power shaft when actuated by the expanding gases of the chambers.

4. An internal combustion engine embodying a cylinder having intake and exhaust ports therein, valve means to open and close the ports at predetermined time for the admission of explosive mixture and egress of exhaust gases, double acting double-headed pistons reciprocable within the cylinder, guide means within the cylinder for the pistons to prevent their rotation therein, a power shaft extending through the pistons and supported at the ends of the cylinder, the shaft guiding the pistons to prevent piston slap in their reciprocation thereon, engaging means upon the power shaft to reciprocate the pistons back and forth, the said means reciprocating the pistons simultaneously in opposite movement with respect to each other so as to hold in balance the reciprocating inertia forces of the pistons and the explosions thereagainst to produce rotation of the power shaft without vibration of the engine.

5. An explosion engine embodying a cylinder having shaft supporting bearings at the ends thereof, a straight crankless power shaft extending longitudinally therethrough and rotatably mounted in the bearings thereof, pistons reciprocable within the cylinder having connecting means to rotate the power shaft, guide means to secure the pistons against rotation, combustion spaces within the cylinder between the pistons and also between the pistons and the ends of the cylinder, each combustion space having a valve and intake and exhaust ports, passages communicating with the combustion spaces and their respective valves, said passages surrounding a portion of their respective valve, the primary explosion of the gas taking place in the passages and expanding in the combustion chamber, said valve operating to allow the burned gases to egress.

6. An explosion engine embodying a cylinder with dual opposed double acting pistons reciprocable therein, a straight power shaft extending co-axially through cylinder and pistons, coupling means fixed to the power shaft to reciprocate the pistons oppositely to each other and for the pistons to rotate the power shaft, combustion spaces between the pistons and at each outer end thereof, a valve unit for each combustion space, a firing chamber surrounding a portion of each valve unit, passages connecting each combustion space with its respective firing chamber, triple headed valves reciprocable in each unit adapted to admit fuel charges into its respective firing chamber and combustion space, and also adapted to exhaust burned gases therefrom to the atmosphere, cam controlled means to reciprocate in unison the two outer valves to cause simultaneous intake, compression and exhaust in the two outer combustion spaces, and another cam controlled means to reciprocate the central valve to cause intake, compression and exhaust in the central combustion space, said means including a hollow oil conveying tube connecting all the valves together.

7. An explosion type engine embodying a cylinder with dual opposed double acting pistons reciprocable therein, a power shaft extending through the cylinder and pistons co-axially longitudinal to the axis of both, disc-like means upon the power shaft to reciprocate the pistons oppositely to each other, guide means for the pistons, combustion chambers between the pistons and at each outer end thereof, said chambers extending to firing chambers with intake and exhaust ports, a valve unit for each firing chamber thus providing two outer valve units and a middle valve unit, a tube connecting the outer valves, a rod passing through the tube connected to the middle valve, a set of spaced apart tandem rollers mounted at one end of one of the outer valves and connected to the tube, another set of spaced apart tandem rollers adjacent the first set and connected to the rod, and cam means for each set of rollers operative to independently reciprocate their respective connected valves.

8. The engine recited in claim 7 including an oil sump and pump, an oil inlet to hollow power shaft from the pump, oil communication from within the hollow portion of the power shaft to its bearing surfaces, oil inlets to the pistons from the shaft, oil outlets from the pistons communicating with a valve tube, for lubricating the valves, said tube having an opening leading to the oil sump.

9. In an explosion engine comprising a cylinder having cylinder heads at both ends thereof with shaft bearings therethrough, dual opposed and double ended double acting pistons reciprocable within the cylinder, a hollow tubular power shaft extending co-axially through the cylinderhead bearings, all the way through the cylinder and the pistons therein, and also extending through an oil sump and gear case secured to the rear cylinder head thereof, coupler means within the pistons to rotate the power shaft, guide means to hold the pistons in straight reciprocatory motion, valve means to admit a fuel mixture in compression chambers at the ends of the pistons and electrical means to fire the mixture, gear means secured to the power shaft within the oil sump gear case, said means driving a hollow pump shaft having an oil passage therethrough, a floating saddle bearing surrounding the power shaft having a circular groove therein communicating with oil holes into the power shaft and pump shaft, and an oil pump mounted upon the pump shaft adapted to deliver its oil through the pump shaft into the power shaft to lubricate the parts communicating therewith, and an extension from the pump shaft for connection with a magneto.

10. In an explosion engine having a cylinder with dual opposed double acting pistons reciprocable therein, said pistons having bottom oil ports, a straight power shaft with an oil passage within its interior extending co-axially through the cylinder and the pistons therein, the shaft having oil outlets within the pistons, cylinder heads with shaft support bearings therethrough, an oil sump secured to one of the cylinder heads with the power shaft extending thereinto, a plurality of valves adjacent the cylinder having a thrust tube for reciprocating them, an oil pump driven by the power shaft within the oil sump, a power shaft extending through the pump to the power shaft engaging driving means on the shaft, a continuous oil circulating passage through the pump into a hollow portion of the pump shaft and extending into the hollow power shaft and then through the oil passage within the power shaft into the pistons where explosion leak pressure within the pistons forces the oil discharged therein through oil ports in the bottom thereof, guide means for the pistons, the oil passage continuing through the guide means, into the valve thrust tube and hence returning to the oil sump.

11. An explosion engine having a cylinder, a piston reciprocable therein, a power shaft driven by the piston, means to intake an explosive charge, chambers adjacent the piston in which to compress and ignite an explosive charge, means to exhaust the burned gases, an air domed pressure tank, an oil sump to provide lubrication, an oil pump in the oil sump having driving means coupled to the power shaft and valve means to divert oil from the engine lubrication system into the air domed pressure tank, oil motor means communicating with the tank and engaging the power shaft so that when oil under pressure in the tank is released the engine is turned over for starting.

12. In combination, an engine having a power shaft, an oil sump at one end of the shaft, an oil circulating pump in the sump, an oil pressure starting motor engaging the power shaft to rotate it and disengaging it upon starting thereof, an air cushioned oil pressure storage tank charged by the lubricating oil pump to a predetermined pressure, an automatic valve between the pump and tank to divert oil from the engine circulating system to the tank, said valve operating to admit oil under air pressure from the starting tank to the oil starting motor to start the engine.

13. An explosion engine comprising an elongated cylinder having dual opposed pistons aligned end to end therein, an oil sump supported by the cylinder, an oil motor in the sump, a hollow oil conveying power shaft extending co-axially through the pistons, through the cylinder and into the oil sump, power transmitting means upon the power shaft to reciprocate the pistons, valve means to charge an explosive mixture between the pistons and at each outer end thereof, electric means to ignite the explosive charge, oil pump means within the oil sump to circulate oil through the hollow centered power shaft to lubricate moving parts of the engine, valve means common to the oil pump tank, and oil motor to divert the oil circulation from the engine to the tank pressure and means to discharge oil under pressure from the tank to the oil motor to supply power to the shaft to produce starting rotation for the engine in the manner described.

14. In an explosion engine comprising a single cylinder with aligned dual opposed double acting free floating pistons reciprocable therein and spaced with respect to each other forming explosion chambers between the pistons and at the outer ends thereof, valved means communicating therewith to intake an explosive charge, compress and ignite the explosive charge and exhaust the burned gases therefrom in timed sequence with respect thereto, shaft supporting bearings extending through the ends of the pistons, shaft supporting bearings extending through cylinder heads a straight hollow tubular power shaft extending through the bearings and the ends of the cylinder, the opening through the power shaft providing for air cooling, liquid cooling, or as a rifle barrel, rotary means within the pistons to rotate the power shaft, or vise versa, a power take off extension at one end of the shaft, an oil sump and gear case surrounding the other end of the shaft and secured to the cylinder, means within the sump to pump lubricating oil through the power shaft to lubricate the moving parts of the engine, and return the oil to the sump, a starting pressure tank, a starting oil motor within the sump connected to the power shaft, and gear means connecting motor and shaft to rotate the engine by oil pressure released from the pressure tank.

15. An internal combustion engine having an elongated cylinder with end heads and a plurality of spaced apart piston units therein forming combustion chambers between one another and between them and the cylinder heads, a straight crankless shaft extending through the cylinder, the end heads, and the piston units within the cylinder, a guide along a portion of the cylinder wall at each piston unit, a sliding element on each guide, a slotted ball in each sliding element, a disc fixed to the shaft at each piston and having sliding engagement in the slot of its respective ball, said disc and ball changing reciprocatory motion of its respective piston into rotary motion at the shaft.

16. The engine recited in claim 15 wherein the slotted ball has a socket made of two complementary parts removable secured in the bottom of each cylinder.

RANSOM Y. BOVEE.